United States Patent [19]
Fulmer et al.

[11] Patent Number: 5,458,371
[45] Date of Patent: Oct. 17, 1995

[54] CRIMP-FORMED JOINT HOUSINGS FOR AIR BAG INFLATORS

[75] Inventors: Brian H. Fulmer, Farr West; Todd S. Parker, Centerville; Bradley W. Smith, Ogden; Christopher Hock, Uintah, all of Utah

[73] Assignee: Morton International, Inc., Chicago, Ill.

[21] Appl. No.: 330,344

[22] Filed: Oct. 27, 1994

[51] Int. Cl.⁶ .................................................. B60R 21/26
[52] U.S. Cl. ......................................... 280/741; 102/531
[58] Field of Search ............................... 280/736, 741, 280/742, 740; 422/164, 165, 166; 102/530, 531

[56] References Cited

U.S. PATENT DOCUMENTS

| | | | |
|---|---|---|---|
| 3,958,949 | 5/1976 | Plantif | 102/531 |
| 3,985,076 | 10/1976 | Schneiter | 422/166 |
| 4,116,466 | 9/1978 | Gehrig . | |
| 4,131,299 | 12/1978 | Ono et al. . | |
| 4,370,930 | 2/1983 | Strasser et al. . | |
| 4,394,033 | 7/1983 | Goetz et al. | 280/736 |
| 4,530,516 | 7/1985 | Adams et al. . | |
| 4,547,342 | 10/1985 | Adams et al. . | |
| 4,561,675 | 12/1985 | Adams et al. . | |
| 4,734,265 | 3/1988 | Nilsson et al. . | |
| 5,000,479 | 3/1991 | Werner et al. | 280/736 |
| 5,139,280 | 8/1992 | Cord et al. . | |
| 5,221,107 | 6/1993 | O'Loughlin | 280/736 |
| 5,260,038 | 11/1993 | Decker et al. | 280/736 |
| 5,275,431 | 1/1994 | Stephens . | |
| 5,306,041 | 4/1994 | Ogawa et al. | 102/530 |
| 5,340,150 | 8/1994 | Haracla et al. | 280/741 |
| 5,382,415 | 1/1995 | Kishimoto et al. | 280/736 |

FOREIGN PATENT DOCUMENTS

| | | | |
|---|---|---|---|
| 2443267 | 3/1975 | Germany | 280/741 |
| 3-186453 | 8/1991 | Japan | 280/736 |

*Primary Examiner*—Karin L. Tyson
*Attorney, Agent, or Firm*—Philip C. Peterson; Gerald K. White

[57] ABSTRACT

An air bag inflator for generating gas to rapidly inflate an air bag includes a housing having spaced-apart opposite end walls with aligned outer peripheral edges, an outer side wall extending between the end walls around the peripheral edges defining an outer chamber for containing gas-generating material and a filter element. The housing also includes an inner side wall extending between the end walls in concentric, centered relation for containing an ignition squib and ignition-enhancing material and provided with ignition ports in communication with the other combustion chamber. The outer side wall is provided with a plurality of ports directing hot products of combustion outwardly to inflate an associated air bag. At least one pair of concentric crimp-formed joints are provided to interconnect the side walls and at least one of the end walls, top or bottom.

51 Claims, 2 Drawing Sheets

CRIMP-FORMED JOINT HOUSINGS FOR AIR BAG INFLATORS

BACKGROUND OF THE INVENTION

1. Field of the Invention

The present invention relates to air bag inflators having a housing or canister with crimp-formed joints. The air bag inflator having a unique housing or canister construction of the present invention employs at least one pair of concentric, crimped-formed joints formed between at least one of a pair of inner and outer side walls and at least one of a pair of opposite end walls to join the side walls and end walls together.

2. Background of the Prior Art

U.S. Pat. No. 4,116,466 discloses an air bag inflator employing a threaded connecting joint between a pair of opposite housing sections. U.S. Pat. No. 4,131,299 discloses a gas generator utilizing a housing having a threaded interconnection between opposite housing wall portions and a threaded closure cap for a central ignition chamber. U.S. Pat. No. 4,370,930 discloses an end cap for a propellent container which has a rolled, crimped-edge for joining the cap to the end of a hollow canister. U.S. Pat. No. 4,530,516 discloses a reduced-weight, air bag inflator housing, having a hollow steel center ring member and a separate retaining ring for holding the stamping formed pressure containment components in place. U.S. Pat. No. 4,734,265 discloses a gas generator for safety belt tightening equipment wherein an ignition plug is held in place by a crimped or press fitted section of a housing wall section. U.S. Pat. No. 5,139,280 discloses a cold-gas, pyrotechnic generator including a cover and base that are friction welded together. U.S. Pat. No. 5,275,431 discloses an air bag inflator assembly wherein a support plate is provided with a retainer crimped to a component of an inflator canister for securing the inflator canister in place.

OBJECTS OF THE INVENTION

It is an object of the present invention to provide a new and improved air bag inflator and more particularly, a new and improved, lower-cost, housing for an air bag inflator.

It is an object of the present invention to provide an air bag inflator housing which utilizes secondary, metal-forming operations to close the inflator housing rather than welding operations when final assembly is completed.

Another object of the present invention is to provide a new and improved air bag inflator housing which utilizes crimp-formed flanges for simplifying the forming operations needed to create the basic parts of an inflator housing and eliminate more expensive metal forgings.

It is another object of the present invention to provide a new and improved air bag inflator housing wherein a joining operation of welding is utilized and wherein many of the components are made from sheet metal and formed with flanged interconnections between parts, thus reducing the cost yet not compromising the strength.

Another object of the present invention is to provide a new and improved air bag inflator housing which utilizes a central tie element of machined or forged construction which functions to contain an initiator and a secondary ignition system, and which secondarily functions as a structural reinforcement enclosure mechanism for an outer envelope of the whole container.

Another object of the present invention is to provide a new and improved automotive air bag inflator having an internal squib integrated into a wall structure of an inflator housing.

More particularly, it is an object of the present invention to provide a new and improved air bag inflator housing design which employs an inner side wall containing an ignition squib and an ignition booster in close proximity, thereby reducing ignition delay.

Still another object of the present invention is to provide a new and improved inflator housing which utilizes crimped joints between side walls and end walls of the housing.

Yet another object of the present invention is to provide a new and improved air bag inflator housing having only a pair of side walls and utilizing crimped joints between the side walls and end walls to define an inner central ignition chamber and a surrounding outer combustion/filter chamber.

Another object of the present invention is to provide a new and improved air bag inflator housing having crimped joints between end walls and side walls and utilizing compressible seal rings for preventing filter blow-by during the combustion process and providing a hermetic seal against the outside environment.

Yet another object of the present invention is to provide a new and improved air bag inflator housing which minimizes the number of hermetic or air-tight seals that are required and utilizing pressure-crimped joints between inner and outer side walls and opposite end walls.

BRIEF SUMMARY OF THE PRESENT INVENTION

The foregoing and other objects and advantages of the present invention are accomplished in a new and improved diffuser housing for an air bag inflator including concentric inner and outer side walls and a pair of opposite end walls joined therewith to form a sealed enclosure for containing solid gas generant material and an ignition system therefor. The inner side wall forms a central ignition chamber for containing an ignition squib and ignition enhancing material and has a plurality of ignition ports in communication with a combination combustion and filter-containing chamber surrounding and formed around the ignition chamber for holding gas generant material and a filter. The outer side wall has a plurality of gas discharging, diffuser ports for directing the gas generated in the inflator housing to rapidly inflate an associated air bag. The inner side wall and the outer side wall are joined to at least one of the end walls for sealing and closing the housing by means of a crimp-formed joint. This enables the housing to be constructed of relatively low-cost metal tube, sheet and plate materials and provides for a faster and easier assembly of the inflator and internal components.

BRIEF DESCRIPTION OF THE DRAWINGS

For a better understanding of the present invention, reference should be had to the following detailed description taken in conjunction with the drawings, in which.

DETAILED DESCRIPTION OF PREFERRED EMBODIMENTS OF THE PRESENT INVENTION

Figure 1:
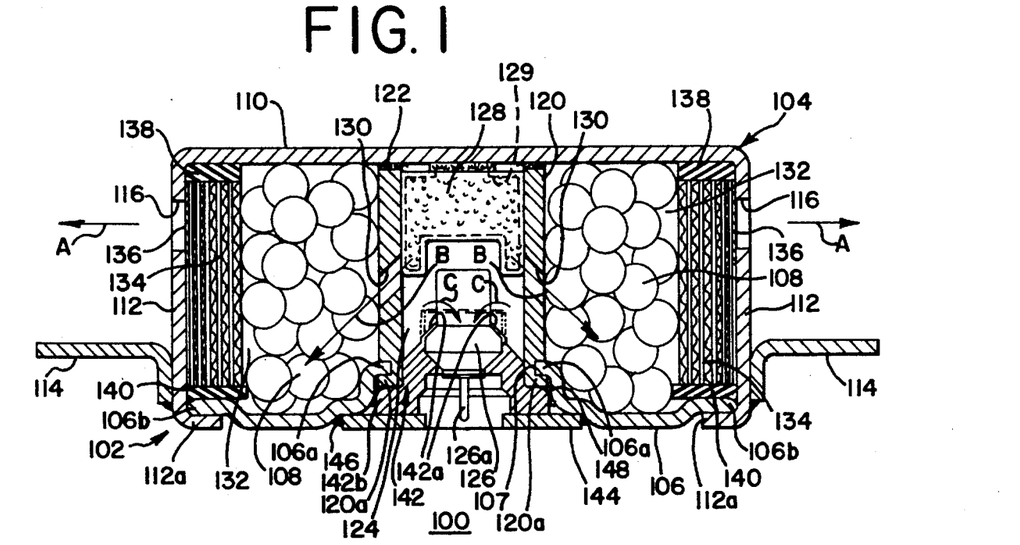
FIG. 1 is a diametrical cross-sectional view of a new and improved air bag inflator and housing constructed in accordance with the features of the present invention.

Referring now more particularly to FIG. 1, therein is illustrated a new and improved air bag inflator for rapidly inflating an air bag upon actuation constructed in accordance with the features of the present invention and referred to generally by the reference numeral 100. Inflator 100 includes a housing or canister 102 formed of metal such as aluminum or steel sheet or plate material having an upper, inverted cup-shaped diffuser cover 104 and a generally circular, annular base 106 having a central opening 107 formed thereon and joined to form a sealed enclosure or housing for containing a quantity of solid, gas generant material 108 in the form of pellets or wafers which rapidly combust to provide a necessary volume of inflation gas for deployment of an air bag in communication with the inflator 100.

The diffuser cover 104 includes a circular top wall 110 and an integral, downwardly depending, cylindrical outer side wall 112 having a radially outwardly extending mounting flange 114 secured thereto for mounting of the inflator 100 in a steering wheel hub assembly of a motor vehicle.

The cylindrical outer wall 112 and the circular top wall 110 may be formed of sheet aluminum or steel in a spin-forming or deep draw operation, and the outer side wall 112 is provided with a plurality of gas discharge ports 116 arranged around the periphery for directing the gas generated in the housing 102 outwardly into an air bag (not shown) as indicated by the radially extending arrows A.

In accordance with the present invention, the inflator 100 also includes a centrally disposed, cylindrical inner side wall 120 in coaxial alignment with the outer side wall 112. The inner side wall 120 has an upper end joined to the interior surface of the top wall 110 by an annular weld 122 which may be formed in a spin type inertia welding operation or other joining method. The inner side wall 120 forms a centrally disposed, ignition chamber 124 for containing an ignition squib 126 and a charge 128 of an ignition-enhancing material contained within an igniter cup 129 positioned in the upper end portion of the chamber. The ignition squib 126 is electrically activated and includes a pair of electrical terminals 126a for connection to an electrical activation system of a motor vehicle.

The inner side wall 120 is formed with a plurality of ignition ports 130 in direct communication between the ignition chamber 124 and an outer, surrounding, annular, combination combustion and filter-containing chamber 132. The gas generant material 108 is arranged in an annular mass and is encircled by an annular filter 134 mounted adjacent the inside surface of the outer side wall 112. The ignition chamber wall ports 130 direct hot combustion products from the ignition squib 126 and the ignition enhancing material 128 into the annulus of gas generant pellets 108 as indicated by the arrows B.

A variety of different types of annular filters 134 may be utilized; and in general, the filter includes a large area, cylindrically-shaped, inner face for receiving hot combustion products generated in the housing 102 and an outer surface in facing confrontation with the diffuser discharge ports 116. The diffuser ports 116 are sealed off against the entry of outside contaminants during the life of the inflator 100 before activation by means of an adhesive aluminum foil sealing tape 136, which is readily ruptured by gas pressure when activation of the inflator 100 to fill an associated air bag takes place. Upper and lower annular end surfaces of the filter 134 are sealed against the underside of the top wall 110 and the upper surface of the base wall 106, respectively, by a pair of resilient, annular, sealing ring gaskets 138 and 140 in order to prevent blow-by of the hot gases around the upper and lower ends of the filter 134. The sealing rings 138 and 140 ensure good filtering action by containing the gas flow within the available flow cross-section of the filter 134 until reaching the diffuser wall ports 116.

In accordance with an important feature of the present invention, a lower end portion 120a of the cylindrical inner side wall 120 is adapted to be crimp-formed over against an adjacent inner edge portion 106a around a central opening 107 in the annular circular base 106 during final assembly of the inflator. Similarly, a lower end portion 112a of the outer cylindrical side wall 112 is designed to be crimped over to establish a crimp-formed joint against an outer peripheral edge portion 106b of the circular base wall 106 to complete the sealing or closing of the canister 102 after all of the internal components have been inserted. Crimping of the outer side wall 112a against the base wall edge portion 106b applies compression against the ring seals 138 and 140 on upper and lower end faces of the filter 134 to provide positive sealing against gas blow-by.

An adapter plug 142 formed of metal holds and supports electrically activated ignition squib 126 and the plug is seated in place to close the lower end of the ignition chamber 124. The squib 126 is secured to the adapter 142 by crimping an open upper end portion 142a over against the upper surface of the squib 126 as shown by the arrows C and in solid lines in FIG. 1. The adapter body 142 includes an outwardly extending, radially disposed lower end flange 142b which abuts the crimped-over, lower end segment 120a of the inner side wall 120 when the adapter is inserted into place in the lower end portion of the central ignition chamber 124. The adapter 142 is provided with a washer-like mounting plate 144 at the lower end which is secured to the base wall 106 by an annular weld 146 to complete the final assembly of the enclosure or diffuser housing 102. A hermetic, resilient, sealing ring or gasket 148 of elastomeric material is disposed between an outer portion of the adapter flange 142b, and confronting the portions of the crimped-over lower end portion 120a of the inner side wall 120 and a surface portion of the base plate 106.

The use of forming procedures in crimping over the lower end portion 120a of the inner side wall 120 against the edge portion 106a around the central opening 107 of the base wall 106 and the crimping over of the lower end portion 112a of the cylindrical outer side wall 112 against the outer edge peripheral portion 106b of the base 106 greatly facilitates the rapid assembly of the air bag inflator 100 and allows the use of relatively lower cost sheet material of aluminum or steel instead of more expensive cast or forged structures. The crimp-forming operations used in joining the inner and outer side walls 120 and 112, respectively, to the base wall 106, provides positive compression on the blow-by seals 138 and 140 acting on the filter 134.

Figure 2:
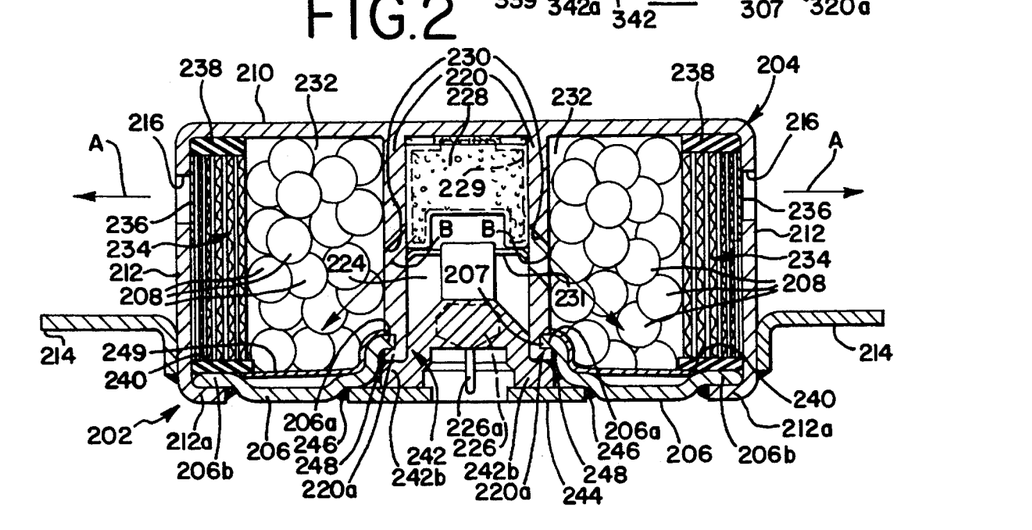
FIG. 2 is a diametrical cross-sectional view of another embodiment of a new and improved air bag inflator and housing constructed in accordance with the features of the present invention.

Referring now more particularly to FIG. 2, therein is illustrated another embodiment of a new and improved air bag inflator for rapidly inflating an air bag constructed in accordance with the features of the present invention and referred to generally by the reference numeral 200. Inflator 200 includes a housing or canister 202 formed of metal such as aluminum or steel sheet or plate material having an upper, inverted cup-shaped diffuser cover 204 and a generally circular, annular base 206 having a central opening 207 and joined to form a sealed enclosure or housing for containing a quantity of solid, gas generant material 208 in the form of pellets or wafers, which rapidly combust to provide a necessary volume of inflation gas for deployment of an air bag in communication with the inflator 200.

The diffuser cover 204 includes a circular top wall 210 and an integral, downwardly depending, cylindrical outer side wall 212 having a radially outwardly extending mounting flange 214 secured thereto for mounting of the inflator 200 in a steering wheel hub assembly of a motor vehicle.

The cylindrical outer side wall 212 and the circular top wall 210 may be formed by forging. The outer side wall 212 is provided with a plurality of gas discharge ports 216 for directing the gas generated in the housing 202 outwardly into an air bag (not shown) as indicated by the radially extending arrows A.

In accordance with the present invention, the inflator 200 also includes a centrally disposed, integrally formed cylindrical inner side wall 220 in coaxial alignment with the outer side wall 212. The inner side wall 220 has an upper end integrally forged to join the interior surface of the top wall 210. The inner side wall 220 forms a centrally disposed, cylindrically-shaped ignition chamber 224 for containing an ignition squib 226 and a charge 228 of an ignition-enhancing material contained within a cup 229 mounted in the upper end portion of the chamber and held in place by a spring washer 231. The ignition squib 226 is electrically activated and includes a pair of dependent electrical terminals 226a for connection to an electrical activation system of a motor vehicle.

The inner side wall 220 is formed with a plurality of ignition ports 230 in direct communication between the ignition chamber 224 and an outer, surrounding, annular, combination combustion and filter-containing chamber 232. The gas generant material 208 is arranged in an annular mass and is encircled by an annular filter 234 mounted adjacent the inside surface of the outer side wall 212. The ignition chamber wall ports 230 direct hot combustion products from the ignition squib 226 and the ignition enhancing material 228 into the gas generant pellets 208 as indicated by the arrows B.

A variety of different types of annular filters 234 may be utilized; and in general, the filter includes a large area, cylindrically-shaped, inner face for receiving hot combustion products generated in the housing 202 and an outer surface in facing confrontation with the diffuser discharge ports 216. The diffuser ports 216 are sealed off against the entry of outside contaminants during the life of the inflator 200 before activation by means of an adhesive aluminum foil sealing tape 236, which is readily ruptured by gas pressure when activation of the inflator 200 to fill an associated air bag takes place. Upper and lower annular end surfaces of the filter 234 are sealed against the underside of the top wall 210 and the upper surface of the base wall 206, respectively, by a pair of resilient, annular, sealing ring gaskets 238 and 240 in order to prevent blow-by of the hot gases around the upper and lower ends of the filter 234. The sealing rings 238 and 240 ensure good filtering action by containing the gas flow within the available flow cross-section of the filter 234 until reaching the diffuser wall ports 216.

In accordance with an important feature of the present invention, a lower end portion 220a of the cylindrical inner side wall 220 is crimp-formed over and against an adjacent inner edge portion 206a around a central opening 207 in the annular circular base 206. During assembly of the inflator, the joint is established in a crimp-forming operation. Similarly, a lower end portion 212a of the outer cylindrical side wall 212 is designed to be crimped over to establish a crimp-formed joint against an outer peripheral edge portion 206b of the circular base wall 206 to complete the sealing or closing of the canister 202 after all of the internal components have been inserted. Crimping of the outer side wall 212a against the base wall edge portion 206b applies compression against the ring seals 238 and 240 on upper and lower end faces of the filter 234 to provide positive sealing against gas blow-by.

An adapter plug 242 formed of metal holds and supports an electrically activated ignition squib 226 and the plug is seated in place to close the lower end of the ignition chamber 224. The squib 226 may be integrally molded into place in the adapter plug 242 with the electrical terminals 226a extending downwardly. The adapter plug 242 includes an outwardly extending, radially disposed, lower end flange 242b which abuts the crimped-over, lower end segment 220a of the inner side wall 220 when the adapter is inserted into place in the lower end portion of the central ignition chamber 224. The adapter 242 is provided with a washer-like mounting plate 244 at the lower end which is secured to the base wall 206 by an annular weld 246 to complete the assembly of the enclosure or diffuser housing 202. A hermetic, resilient, sealing ring or gasket 248 of elastomeric material is disposed between an outer portion of the adapter flange 242b, and confronting the portions of the crimped-over lower end portion 220a of the inner side wall 220 and an outer surface portion of the base plate 206. In order to retain the gas generant pellets 208 in place before the crimp-formed joints are accomplished, a thin holding cover 249 of annular shape may be inserted between the lower ring seal 240 and the inner side wall 220.

The use of forming procedures in crimping over the lower end portion 220a of the inner side wall 220 against the edge portion 206a around the central opening 207 of the base wall 206 and the crimping over of the lower end portion 212a of the cylindrical outer side wall 212 against the outer edge peripheral portion 206b of the base 206 greatly facilitates the rapid assembly of the air bag inflator 200 and allows the use of relatively lower cost sheet material of aluminum or steel for the base 206. The crimp-forming operations used in joining the inner and outer side walls 220 and 212, respectively, to the base wall 206, provides positive compression on the blow-by seals 238 and 240 at opposite end faces of the filter 234.

Figure 3:
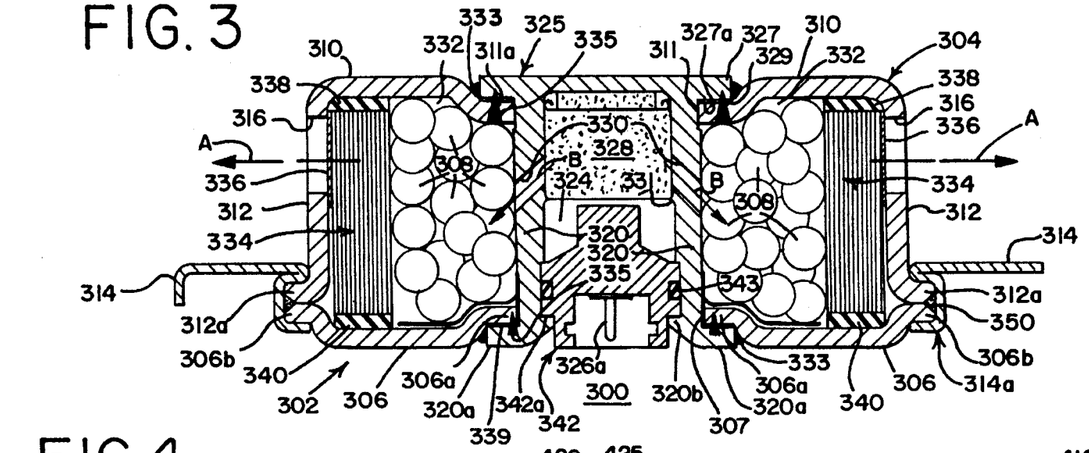
FIG. 3 is a diametrical cross-sectional view of yet another embodiment of a new and improved air bag inflator and housing constructed in accordance with the features of the present invention.

Referring now more particularly to FIG. 3, therein is illustrated yet another embodiment of a new and improved air bag inflator for rapidly inflating an associated air bag constructed in accordance with the features of the present invention and referred to generally by the reference numeral 300. Inflator 300 includes a housing or canister 302 formed of sheet metal such as aluminum or steel having an upper, inverted cup-shaped diffuser cover 304 and a generally circular, annular base 306 joined to form a sealed enclosure or housing for containing a quantity of solid, gas generant material 308 in the form of pellets or wafers. The gas generant material 308 is adapted to rapidly combust to provide a necessary volume of inflation gas for deployment of an air bag in communication with the inflator 300.

The diffuser cover 304 includes a circular top wall 310 having a central aperture 311 therein. An integral, downwardly depending, cylindrical outer side wall 312 joins the outer peripheral edge of the top wall. A radially outwardly extending mounting flange 314 is secured to the outer side wall 312 for mounting of the inflator 300 in a steering wheel hub assembly (not shown) of a motor vehicle.

The cylindrical outer side wall 312 and the circular top wall 310 may be formed of sheet aluminum or steel in a spin-forming or deep draw operation, and the outer side wall 312 is provided with a plurality of gas discharge ports 316 for directing the gas generated in the housing 302 outwardly into an air bag (not shown) as indicated by the radially extending arrows A.

In accordance with the present invention, the inflator 300 includes a cylindrical ignition chamber 324 which is formed by a rivet-like forged member 325 having a circular top wall 327 with an outer edge portion 327a facing a circular edge portion 311a on the upper surface of the top wall 310 around the central opening 311. An annular sealing gasket 329 is placed between the edge portions 327a and 311a to provide an airtight hermetic seal. In lieu of a sealing gasket 329 and for additional strength, an outer edge of the top wall 327 may be welded to the depressed circular edge portion 311a of the top wall 310 with an annular weld 333 forming a hermetic seal. Alternatively, an annular weld 335 (dotted lines) such as a laser weld or shot weld may be provided between the edge portions 311a and 327a to provide a hermetic seal in lieu of the gasket 329. The member 325 includes an integral, inner side wall 320 in coaxial alignment with the outer side wall 312 extending downwardly from the underside of the top wall 327.

The ignition chamber 324 contains an ignition squib integrally molded in an adapter 342 at the lower end portion and a charge of an ignition-enhancing material 328 contained within an igniter cup 349 positioned in an upper end portion and secured in place after insertion by an upset ring 331 formed on the inside wall surface of the inner side wall 320. The ignition squib is electrically activated and includes a pair of dependent electrical terminals 326a for connection to an electrical activation system of a motor vehicle.

The inner side wall 320 is formed with a plurality of ignition ports 330 in direct communication between the ignition chamber 324 and an outer, surrounding, annular, combination combustion and filter-containing chamber 332. The gas generant material 308 is arranged in an annular mass and is encircled by an annular filter 334 mounted adjacent the inside surface of the outer side wall 312. The ignition chamber wall ports 330 direct hot combustion products from the ignition squib 326 and the ignition enhancing material 328 into the annulus of gas generant pellets 308 as indicated by the arrows B when the inflator 300 is activated.

A variety of different types of annular filters 334 may be utilized. In general, the filter includes a large-sized area of cylindrical shape forming an inlet side or inner face for receiving hot combustion products generated in the housing 302. A cylindrical outer face of the filter 334 is positioned in facing confrontation with the diffuser discharge ports 316.

The diffuser ports 316 are sealed off against the entry of outside contaminants during the life of the inflator 300 before activation by means of an adhesive aluminum or metallized foil sealing tape 336, which is readily ruptured by gas pressure when activation of the inflator 300 takes place. Upper and lower annular end surfaces of the filter 334 are sealed against the underside of the top wall 310 and the upper surface of the base wall 306, respectively, by a pair of resilient, annular, sealing ring gaskets 338 and 340 in order to prevent blow-by of the hot gases around the upper and lower ends of the filter 334. The sealing rings 338 and 340 ensure good filtering action by containing the gas flow within the available flow cross-section of the filter 334 until reaching the diffuser wall ports 316.

In accordance with an important feature of the present invention, a lower end portion 320a of the cylindrical inner side wall 320 is adapted to be crimp-formed over against an adjacent inner edge portion 306a around a central opening 307 in the annular circular base 306. The central openings 311 and 307 in the respective top wall 310 and base 306 are in coaxial alignment and equal in diameter to accommodate the inner side wall 320 of the forged member 325 which extends through the openings. A sealing gasket 339 may be provided between the crimped-over lower end portion 320a of the inner side wall 320 and the edge portion 306a of the base wall 306 around the central opening 307. In lieu of the gasket 339, annular welds like the welds 333 and 335 may be utilized to provide a hermetic seal between the edge portions 306a and 320a. During assembly of the inflator 300, the joint between the edge portions 306a and 320a is established in a crimp-forming operation.

A flanged plug 342 containing the electrically activated ignition squib is seated in place to close the lower end of the ignition chamber 324 during final assembly. The plug 342 is secured in place by a crimp-forming operation to provide an inwardly directed upset ring 320b which bears against a shoulder 342a on the plug. The adapter plug 342 is provided with a seal ring 343 which bears against the inner side wall 320 when the squib containing adapter 342 is inserted into place in the lower end portion of the central ignition chamber 324 to provide a hermetic seal.

Figure 3A:
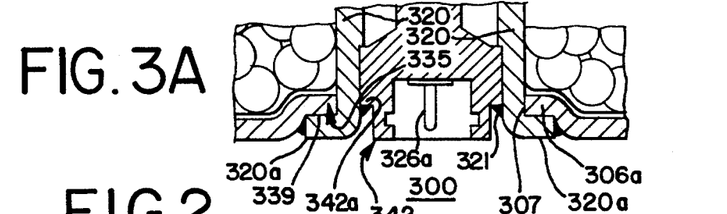
FIG. 3A is a fragmentary portion of a diametrical cross-sectional view of the air bag inflator and housing of FIG. 3 employing a modified adapter and means of securing the adapter in place in accordance with the present invention.

Referring to FIG. 3A, therein is illustrated an air bag inflator 300 which includes a modified adapter plug 342 having no seal ring 343 and secured in position by an annular weld 321 which provides a hermetic seal rather than by a radially inwardly directed crimped-over lower edge portion 320b as shown in FIG. 3.

At the lower end the outer side wall 312 is formed with an outwardly extending radial flange 312a which abuts against an outer edge portion 306b of the base 306. The abutting surfaces are held together to hermetically seal the housing 302, by means of a channel-like, roll-formed inner edge portion 314a of the mounting bracket 314. If required, a seal 350 or a weld may be utilized to ensure a hermetic seal between the outer side wall 312 and the base wall 306.

The use of forming procedures in crimping over the lower end portion 320a of the inner side wall 320 against the edge portion 306a around the central opening 307 of the base wall 306 and the upset or crimping over of the inside end portion 320b against the adapter plug 342 facilitates the rapid assembly of the air bag inflator 300 and allows the use of relatively lower cost sheet material of aluminum or steel to be used instead of more expensive cast or forged structures. Alternately, the adapter plug 342 may be welded into rivet-like member 325 eliminating need for crimped over inside end portion 320b and seal ring 343. The strong rivet-like forged member 325 provides an excellent way of securing central portions of the top wall 310 and base wall 306 against bulging or fracture from gas pressure when the inflator 300 is activated.

Figure 4:
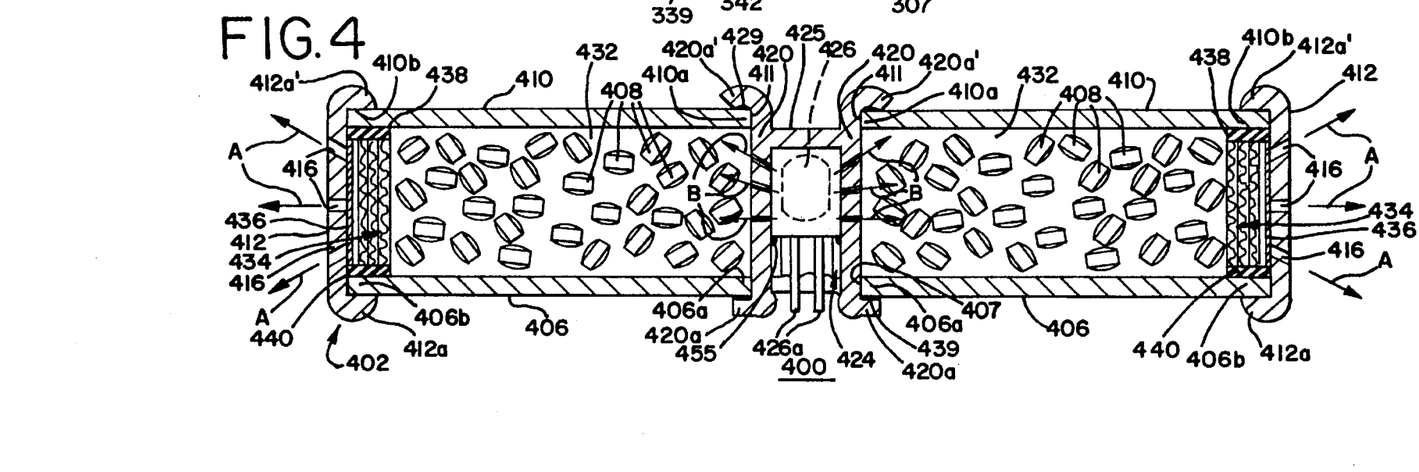
FIG. 4 is a diametrical cross-sectional view of still another embodiment of a new and improved air bag inflator and housing constructed in accordance with the features of the present invention.

Referring now more particularly to FIG. 4, therein is illustrated yet another embodiment of a new and improved air bag inflator for rapidly inflating an air bag constructed in accordance with the features of the present invention and referred to generally by the reference numeral 400. The inflator 400 includes a housing or canister 402 formed of sheet metal such as aluminum or steel and hollow tubular elements of similar material. The housing 402 includes an annular, generally circular, washer-like top wall 410 having a central opening 411 and a parallel, similarly dimensioned annular base 406. These end walls 406 and 410 are joined together by concentric, tubular inner and outer side walls 420 and 412, respectively, to form a sealed enclosure or housing for containing a quantity of solid, gas generant material 408 in the form of pellets or wafers, which rapidly combust to provide a necessary volume of inflation gas for deployment of an air bag in communication with the inflator 400.

The outer side wall 412 is provided with a plurality of gas discharge ports 416 around the periphery for directing the gas generated in the housing 402 outwardly into an air bag (not shown) as indicated by the outwardly extending arrows A.

In accordance with the present invention, the tubular inner side wall 420 has an upper end portion 420a' which is crimp-formed outwardly to face an edge portion 410a on the outer surface of the top wall 410 around the central opening 411. A sealing ring or gasket 429 may be provided between the portions 410a and 420a' to ensure a hermetic seal. The inner side wall 420 forms a centrally disposed, ignition chamber 424 for containing an integrally molded-in-place ignition squib 426 which is electrically activated and including a pair of dependent electrical terminals 426a for connection to an electrical activation system of a motor vehicle. The upper end of the ignition chamber 424 is closed by an integrally formed end wall 425 which forms the base of an inverted cup for containing and supporting the squib 426.

The tubular inner side wall 420 is formed with a plurality of ignition ports 430 in direct communication with an outer, surrounding, annular, combination combustion and filter-containing chamber 432. The gas generant material 408 is arranged in an annular mass and is encircled by an annular filter 434 mounted adjacent the inside surface of the tubular outer side wall 412. The ignition chamber wall ports 430 are designed to direct hot combustion products from the ignition squib 426 into the annulus of gas generant pellets 408 as indicated by the arrows B.

A variety of different types of annular filters 434 may be utilized; and in general, the filter includes a large size inlet area of cylindrical shape as an inner face for receiving hot combustion products generated in the housing 402. The filter includes a cylindrical outer surface in facing confrontation with the diffuser discharge ports 416. The ports 416 are sealed off against the entry of outside contaminants during the inactive life of the inflator 400 before activation by means of an adhesive aluminum foil sealing tape 436, which is readily ruptured by gas pressure when activation of the inflator 400 takes place. Upper and lower annular end surfaces of the filter 434 are sealed against the underside of the top wall 410 and the upper surface of the base wall 406, respectively, by a pair of resilient, annular, sealing ring gaskets 438 and 440 in order to prevent blow-by of the hot gases around the upper and lower ends of the filter 434. The sealing rings 438 and 440 ensure good filtering action by containing the gas flow within the available flow cross-section of the filter 434 until reaching the diffuser wall ports 416.

In accordance with an important feature of the present invention, a lower end portion 420a of the tubular inner side wall 420 is crimp-formed over and against an adjacent inner edge portion 406a around a central opening 407 provided in the annular circular base 406. During assembly of the inflator, the joints between the portions 406a and 420a are established in a crimp-forming operation. Upper and lower end portions 412a' and 412a of the outer tubular side wall 412 are designed to be crimped over to establish crimp-formed joints against outer peripheral edge portions 410b and 406b of the annular circular top wall 410 and the base wall 406 to complete the sealing or closing of the canister 402 after all of the internal components have been inserted. Crimping of the tubular outer side wall portions 412a and 412a' against the top wall edge portion 410b and base wall edge portion 406b applies compression against the ring seals 438 and 440 on upper and lower end surfaces of the filter 434 to provide positive sealing against gas blow-by and form hermetic seals between the top and bottom end walls 410 and 406 and the tubular outer side wall 412.

An ignitor containing the molded-in-place, electrically activated ignition squib 426 is seated in the ignition chamber 424 and held in place by an upset-formed ring 455 on the inside surface of the tubular inner side wall 420.

The use of forming procedures in crimping over both the upper and lower end portions of the tubular inner side wall 420 and the outer side wall 412 against the bottom wall 406 and top wall 410 greatly facilitates the rapid assembly of the air bag inflator 400 and allows the use of relatively lower cost tubular and sheet or plate material of aluminum or steel instead of more expensive cast or forged structures.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An inflator for generating gas to rapidly inflate an air bag, comprising:

a quantity of gas generating material;

housing means having spaced apart opposite end walls with aligned outer peripheral edges;

an outer side wall extending between said upper and lower end walls around said peripheral edges thereof defining an enclosure for holding an annular filter element adjacent said outer side wall and providing an annular chamber inside said filter element for holding the quantity of gas generating material;

an annular filter in said housing means adjacent an inner surface of said outer side wall for entrapping combustion residue from said gas generated in said housing means before discharge of said gas;

an inner side wall extending between said end walls in concentric centered relationship with said outer side wall defining a central ignition chamber for containing an igniter, wherein the gas generating material is held between the inner side wall and the filter element;

said inner side wall formed with a plurality of ignition ports spaced apart around the periphery thereof for directing hot ignition gases into said annular chamber for igniting the gas generating material;

said outer side wall formed with a plurality of diffusion ports spaced apart around the periphery thereof for directing gases from the gas generating material outwardly to rapidly inflate said air bag;

a pair of resilient annular sealing rings for sealing between facing interior surfaces of said opposite end walls and respective adjacent annular opposite end portions of said annular filter for preventing gas generated in said housing means from bypassing said filter to reach said diffusion ports; and at least one crimp-formed annular flange on said outer side wall engaging at least one of said end walls for closing said housing means and compressing said sealing rings to seal said opposite end portions of said filter to seal against blow-by.

2. The inflator of claim 1, wherein:

at least one of said end walls is integrally formed with at least said outer side wall.

3. The inflator of claim 1, including:

a plurality of said crimp-formed flanges formed adjacent opposite ends of said outer side wall for respectively sealingly engaging both of said end walls.

4. The inflator of claim 1, wherein:

at least one of said end walls is joined to an adjacent end of said inner side wall in a crimp-formed joint.

5. The inflator of claim 4, including:

a plurality of said crimp-formed joints formed adjacent opposite ends of said inner side wall for respectively sealingly engaging both of said end walls.

6. The inflator of claim 4, wherein:

one end of said inner side wall is integrally formed with an adjacent end wall and an opposite end of said inner side wall is joined with an opposite end wall in a crimp-formed joint.

7. The inflator of claim 4, wherein:

one end of said inner side wall is welded to an adjacent end wall and an opposite end of said inner side wall is joined with an opposite end wall in a crimp-formed joint.

8. The inflator of claim 4, wherein:

one of said end walls is interconnected with both said inner and outer side wall with crimp-formed joints.

9. The inflator of claim 1, wherein said inner side wall includes an integral closed end forming a central wall portion closing an opening in one of said end walls.

10. The inflator of claim 4, wherein:

one of said crimp-formed joints includes a crimped mounting ring engaging said outer side wall and said outer peripheral edge of one of said end walls.

11. A housing for an air bag inflator, comprising:

a quantity of gas generating material;

cylindrical inner and outer side walls and a pair of opposite end walls joined therewith to form a sealed enclosure;

said inner side wall forming a central ignition chamber for containing ignition means and having a plurality of gas ports in communication with a gas generation chamber holding the gas generation material around said ignition chamber;

said outer side wall having a plurality of gas exit ports for discharging gas generated in said gas generation chamber for inflating an air bag;

an annular filter in said gas generation chamber adjacent an inner surface of said outer side wall for entrapping combustion residue from said gas generated in said housing before discharge of said gas through said exit ports;

a pair of resilient annular sealing rings for sealing between facing interior surfaces of said opposite end walls and respective, adjacent, annular opposite end portions of said annular filter for preventing gas generated in said housing from bypassing said filter to reach said gas exit ports;

said outer side wall having a crimp-formed end flange engaging at least one of said end walls to close said housing and compress said resilient sealing rings to seal said opposite end portion of said filter to seal against blow-by; and at least said inner side wall having at least one end crimped over against one of said end walls for closing said housing means to form said sealed enclosure.

12. The housing of claim 11, including:

outer port sealing means secured adjacent an inside surface of said outer side wall for sealing between said exit ports and said gas generation chamber in said enclosure.

13. The housing of claim 11, wherein:

at least one of said end walls has a central opening therein; and including a closure wall integral with said inner side wall engaging said one end wall to close said opening.

14. The housing of claim 11, wherein:

at least one of said end walls has a central opening therein; and said inner side wall extends through said opening and is crimped over against an outer surface of said one end wall around said opening to seal between said inner side wall and said one end wall.

15. The housing of claim 14, wherein:

both of said end walls have a central opening; and said inner side wall extends through said openings and is crimped over against outside surfaces of said end walls around said openings to seal between said inner side wall and both said end walls.

16. The housing of claim 11, wherein:

said inner side wall and a central portion of an end wall form a cup for containing said ignition means.

17. The housing of claim 11, including radial flange means secured to said outer side wall for mounting said housing.

18. A housing for an air bag inflator, comprising:

a base and a spaced apart coaxial aligned top wall having matching aligned peripheral edges and aligned central openings;

a tubular outer side wall extending between said aligned peripheral edges of said base and said top wall and having a plurality of gas exit ports;

an annular filter in said housing adjacent an inner surface of said outer side wall for entrapping combustion residue from said gas generated in said housing before discharge of said gas from said housing;

a pair of resilient annular sealing rings for sealing between facing interior surfaces of said base and top walls and, respective, adjacent, annular opposite end portions of said annular filter for preventing gas generated in said housing from bypassing said filter to reach said outer side wall;

said tubular outer side wall having at least one crimp-formed annular end flange engaging an outer surface of said bottom wall for closing said housing and compressing said sealing rings against said opposite end portions of said filters to seal against blow-by;

a tubular inner side wall extending between said aligned central openings and crimped over against opposite outer faces of said base and said top wall; and said inner side wall having a plurality of ignition ports therein and defining an ignition chamber for containing ignition materials ignitable to direct hot ignition gas outwardly through said ports for initiating combustion of gas generating materials contained in a combustion chamber defined outside of said ignition chamber between said inner and outer side walls, said outer side having a plurality of diffuser ports for directing generated gas outwardly to inflate an associated air bag.

19. The housing of claim 18, wherein:

said inner side wall extends through said openings and is crimped over for sealing against an outer surface of said base and top wall around an edge of said opening therein.

20. The housing of claim 19, wherein:

said top and bottom walls have central openings of equal size; and said inner side wall extends through said openings and is crimped over against outside surfaces of said top and bottom walls around said openings for sealing between said inner side wall and both said end walls.

21. The housing of claim 18, wherein:

said inner side wall includes an integral wall adjacent an end portion forming a cup for containing said ignition means.

22. The housing of claim 21, wherein:

said ignition means is held in said cup by sealing means adjacent an opposite end portion of said inner side wall.

23. The inflator of claim 18, including:

a plurality of said crimp-formed annular end flanges formed adjacent opposite ends of said outer side wall for respectively sealingly engaging said base and said top wall.

24. The inflator of claim 18, wherein:

said inner side wall includes an integral closed end forming a central wall portion closing an opening in said top wall.

25. The housing of claim 18, wherein:

said inner side wall has an integral closure wall adjacent one end forming a central segment of said top wall.

26. The housing of claim 18, wherein:

said ignition materials are secured to an inside surface of said inner side wall and said closure; and sealing means spaced apart from said one end of said inner side wall for sealing said ignition material in said ignition chamber.

27. The housing of claim 26, wherein:

said ignition materials are hermetically sealed in said ignition chamber.

28. A housing for an air bag inflator for containing ignition material, gas generating material and a filter, comprising:

a base having a central opening and an outer peripheral edge in coaxial alignment therewith, and a cover having a top wall spaced opposite said base and having a depending, peripheral outer side wall having a plurality of gas exit ports;

an annular filter in said housing adjacent an inner surface of said outer side wall for entrapping combustion residue from said gas generated in said housing before discharge of said gas from said housing;

a pair of resilient annular sealing rings for sealing between facing interior surfaces of said base and top walls and respective, adjacent, annular opposite end portions of said annular filter for preventing gas generated in said housing from bypassing said filter to reach said outer side wall;

said outer side wall having an annular end flange at a lower end portion crimped over against a lower surface of said base to close said housing and compress said sealing rings to seal said opposite annular end portions of said filter to seal against blow-by;

an inner side wall in coaxial alignment with said outer side wall having an upper end in contact with said top wall and a lower end portion crimped over against said lower surface of said base defining a central ignition chamber for said ignition material; and said inner and outer side wall defining an annular outer chamber for containing said gas generating material and said filter.

29. The inflator of claim 28, wherein:

one end of said inner side wall is integrally formed with an adjacent end wall and an opposite end of said inner side wall is joined with a top wall and base in a crimp-formed joint.

30. The inflator of claim 28, wherein:

one end of said inner side wall is welded to an adjacent end wall and an opposite end of said inner side wall is joined with a top wall and base in a crimp-formed joint.

31. The housing of claim 28, wherein:

said filter has a cylindrical outer surface adjacent an inside surface of said outer side wall and a pair of said annular opposite end portions facing parallel of said base and said top wall;

said pair of annular resilient sealing rings being disposed on said annular opposite end faces against said base and top wall; and said annular end flange at said, lower-end portion of said outer side wall biasing said base toward said top wall to compress said annular sealing rings against said opposite end portions of said filter for preventing blow-by of generated gas around said filter while moving from said generant material toward said exit ports in said outer side wall.

32. The housing of claim 28, including:

an adapter plug closing a lower end of said inner side wall; and wherein said ignition material is mounted in said adapter plug.

33. The housing of claim 32, wherein:

said adapter plug includes flange means overlying said crimped-over lower end portion of said inner side wall.

34. The housing of claim 32, wherein:

said adapter plug includes an upper end portion adapted to be bent over to secure said ignition material in said plug.

35. The housing of claim 33, wherein:

said adapter plug includes an outer annular washer-like element sealed against an outside surface of said base.

36. The housing of claim 28, including:

ignition-enhancing means mounted in said ignition chamber adjacent said ignition material and said top wall.

37. The housing of claim 36, including:

spring washer means engaging said inner side wall for securing said ignition enhancer in said ignition chamber.

38. A housing for an air bag inflator, comprising:

a base having a central opening and an outer peripheral edge;

a cover including a top wall spaced opposite said base having a central opening aligned with said central opening in said base and including a depending outer side wall having a plurality of gas exit ports and having a lower end joined to said base adjacent said outer peripheral edge;

an annular filter in said housing adjacent an inner surface of said outer side wall for entrapping combustion residue from said gas generated in said housing before discharge of said gas through said exit ports;

a pair of resilient annular sealing rings for sealing between facing interior surfaces of said base and top walls and respective, adjacent annular, opposite end portions of said annular filter for preventing gas generated in said housing from bypassing said filter to reach said gas exit ports;

said outer side wall having an annular end flange at a lower end crimp-formed over against said base to close said housing while compressing said sealing rings to seal between said opposite end portions of said base and top wall to prevent filter blow-by; and a ported inner side wall extending between said aligned central openings of said base and top wall having a lower end portion crimped over against an outer surface of said base around said central opening and having a flanged end wall at the upper end engaging an outer surface of said top wall forming a central ignition chamber and a combustion chamber outwardly thereof.

39. The housing of claim 38, wherein:

said inner side wall is formed by a forged member and said flanged end wall is an integral portion thereof.

40. The housing of claim 38, including:

ignition-enhancing means mounted in said combustion chamber adjacent said flanged end wall.

41. The housing of claim 40, wherein:

said ignition-enhancing means is secured in said ignition chamber by an upset portion formed on an inside surface of said inner side wall.

42. The housing of claim 38, including:

an adapter plug for closing a lower end of said ignition chamber; and said inner side wall includes an inwardly directed end portion crimped-over against a surface on said adapter plug to secure the plug in place.

43. The housing of claim 42, including:

an ignition squib mounted in said adapter plug and adapted to be electrically activated to ignite for deployment of an associated air bag.

44. The housing of claim 43, including:

sealing means between said adapter plug and an inside surface of said inner side wall.

45. The housing of claim 42, wherein:

said ignition squib includes electrical terminals protruding out from said adapter plug for connection to a source generating an electrical ignition signal.

46. The housing of claim 38, wherein:

said outer side wall and said base are formed with abutting radially outwardly projecting peripheral flanges, and including;

a crimp-formed ring engaging said peripheral flanges securing the same together to seal said housing.

47. The housing of claim 46, including:

an externally applied seal ring between said peripheral flanges.

48. The housing of claim 33, wherein:

said flange means of said adapter plug is welded to said base outwardly of said central opening.

49. The housing of claim 46, including:

mounting flange means extending radially outwardly of said outer side wall for mounting said housing integrally joined with said crimp-formed ring.

50. The housing of claim 17, wherein:

said radial flange means includes an inner ring portion welded to said outer side wall.

51. The housing of claim 40, wherein:

said ignition enhancing means is secured to an inside surface of a lower end portion of said inner side wall by welding establishing a hermetic seal.

* * * * *

UNITED STATES PATENT AND TRADEMARK OFFICE
CERTIFICATE OF CORRECTION

PATENT NO. : 5,458,371
DATED : October 17, 1995
INVENTOR(S) : Fulmer et al.

It is certified that error appears in the above-indentified patent and that said Letters Patent is hereby corrected as shown below:

Col. 13, Ln. 53, change "claim 18" to read -- claim 25 --.

Signed and Sealed this

Twenty-fourth Day of December, 1996

Attest:

BRUCE LEHMAN

Attesting Officer     Commissioner of Patents and Trademarks